UNITED STATES PATENT OFFICE.

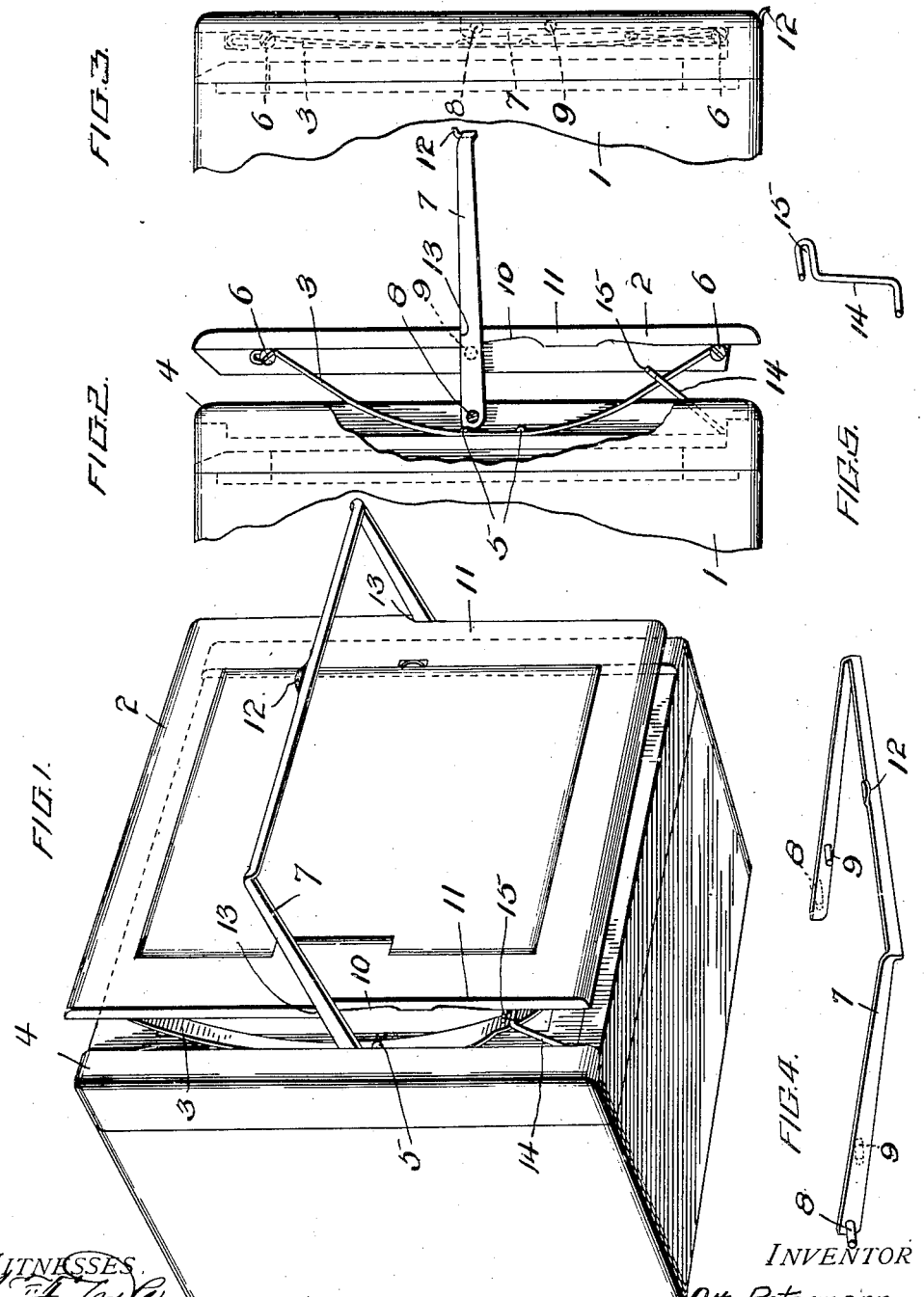

OTTO PETERMANN, OF GROTON, NEW YORK.

CAMERA-BACK.

1,066,941.                    Specification of Letters Patent.        Patented July 8, 1913.

Application filed September 27, 1911. Serial No. 651,667.

*To all whom it may concern:*

Be it known that I, OTTO PETERMANN, a citizen of the United States, and a resident of Groton, in the county of Tompkins and State of New York, have invented certain new and useful Improvements in Camera-Backs, of which the following is a specification.

The present invention relates in general to certain new and useful improvements in the construction of cameras of that general type in which a plate holder or like member is clamped in position by means of a spring actuated frame.

In cameras of this character considerable annoyance and difficulty is frequently experienced in placing the plate holder or like member in position and removing it therefrom, the camera being at times bodily moved so as to destroy the focus or change the direction in which it is pointing so as to spoil the view, and the object of the present invention has been to overcome this difficulty by the provision of novel means whereby the spring actuated frame can be moved away from the camera box and held spaced therefrom while the plate holder is being inserted in position or removed therefrom.

A further object of the invention is to accomplish this result by means of simple and inexpensive mechanism which will not add materially to the cost of manufacturing the camera, which can be easily and quickly manipulated, and which swings into an out of the way position when not in use.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a perspective view of a camera box provided with the invention, the spring actuated frame being shown as held in a position spaced from the camera preparatory to inserting a plate holder or like member in position. Fig. 2 is a side elevation of the same, portions being broken away. Fig. 3 is a side elevation of the rear portion of the camera box, the spring actuated frame being collapsed against the camera box and the mechanism embodying the present invention being folded into inoperative position. Fig. 4 is a detail view of the frame controlling lever, and Fig. 5 is a detail view of the stop or check member which serves to hold the frame substantially parallel to the camera box.

Corresponding and like parts are referred to in the following description and indicated in all the views of the drawings by the same reference characters.

Specifically describing the present embodiment of the invention, the numeral 1 designates a camera box, and 2 a ground glass frame which is designed to fit against the rear of the camera box and is held yieldingly in position by means of spring strips 3 applied to opposite sides thereof. The ground glass frame is received between side flanges 4 when collapsed against the camera box, as shown in Fig. 3, the back of the frame being then flush with the said flanges. The spring strips 3 are secured at an intermediate point in their length to the camera box 1, as indicated at 5, the ends of the spring strips engaging pins 6 or similar members upon the ground glass frame.

The above is the usual construction employed in cameras of this character, one end of the ground glass frame being adapted to be grasped by the fingers and pulled away from the camera box to admit the end of a plate holder preparatory to forcibly pushing the plate holder into position. This manner of inserting the plate holder is rather unsatisfactory, however, since it is frequently necessary to apply a considerable amount of force thereto, thereby either moving the camera so as to destroy the focus thereof or injuring some part of the plate holder or camera. This annoying feature has been eliminated in the present instance by the provision of a lever 7 by means of which the frame 2 can be forced away from the camera box and held spaced therefrom when manipulating the plate holder. This lever 7 is substantially U shaped in construction, and, when swung outwardly into operative position as shown in Fig. 1, straddles the frame 2.

The ends of the lever 7 are pivotally connected at 8 to some suitable portion of the camera box, such as to the inner sides of the flanges 4, and the opposite sides of the lever are provided with pins or projections 9 adapted to engage the frame 2. When the lever is swung outwardly the pins or projections 9 engage cam depressions 10 in the sides of the frame 2 and force the frame outwardly against the action of the spring strips. When it is desired to release the frame 2 it is merely necessary to swing the lever 7 against the camera box, as indicated in Fig. 3. The two arms of the lever are then received within cut away portions 11 formed in the side edges of the frame 2 at one end thereof, while the cross bar of the lever fits closely against the sides of the camera. This cross bar may be provided with a finger piece 12 for convenience in manipulating the same, and the outward swinging movement of the said lever is limited by contact of the arms thereof with the shoulders 13 at the inner ends of the cut away portions 11.

It will be obvious that upon the initial outward movement of the lever 7 the pins or shoulders 9 thereon will engage the frame 2 at one side of the center thereof and will accordingly tend to force one end of the frame out in advance of the opposite end thereof. This is, of course, not objectionable, it being merely desirable that the frame assume a position parallel to the camera box when it has reached the limit of its movement. In order to insure a proper positioning of the parts when the frame 2 has been forced rearwardly, a swinging stop member 14 is arranged at one end of the frame, the said swinging stop member being pivotally connected to the camera box and being provided with a lateral arm 15 adapted to engage the spring strip 3. This stop member collapses against the camera box when the frame is sprung inwardly, and is properly proportioned so as to limit the outward movement of the adjacent end of the frame 2 and cause the frame to assume a position parallel to the camera box when the lever 7 has reached the outer limit of its swinging movement.

In the operation of the device, it will be obvious that preparatory to inserting a plate holder in position or removing it therefrom it is merely necessary to grasp the finger piece 12 and swing the lever 7 outwardly. The plate holder can then be readily manipulated without the necessity of applying the usual force thereto such as would be necessary to overcome the action of the springs 3. After the plate holder has been inserted in position the lever 7 can be swung inwardly so as to release the frame 2 and permit the same to bear against the plate holder so as to clamp it tightly against the camera box, and in a similar manner after the plate holder has been removed, it is merely necessary to swing the lever inwardly and release the frame 2 to admit of the same being sprung against the camera box into the usual position assumed when the camera is not in use.

Having thus described the invention, what I claim as new and desire to secure by Letters Patent, is:—

1. In a device of the character described, the combination of a camera box, a spring actuated clamping frame upon the camera box, and a U shaped lever pivoted to the box and adapted to straddle the clamping frame, the said lever being provided with projections for engagement with the frame to move it into an open position.

2. In a device of the character described, the combination of a camera box, a spring actuated clamping frame upon the box, a U shaped lever pivoted to the box and adapted to straddle the clamping frame, the said lever being provided upon opposite arms thereof with projections adapted to engage the frame to force it into an open position, and means to hold the frame in a position substantially parallel to the box when in an open position.

3. In a device of the character described, the combination of a camera box, a clamping frame, a spring strip having an intermediate portion thereof secured to the box while the ends thereof engage the clamping frame at points toward opposite ends thereof, a lever pivoted upon the box and formed with a projection adapted to engage an intermediate portion of the clamping frame to force the same outwardly against the action of the spring, and a hooked stop member pivoted to the box and adapted to engage one end of the spring strip to hold the clamping frame in a position substantially parallel to the camera box when in an open position.

Signed at New York city in the county of New York and State of New York, this 26" day of September, A. D. 1911.

OTTO PETERMANN.

Witnesses:
VIOLA E. HUGHES,
WM. VANDER ROEST.